May 12, 1953  W. K. LEWIS, JR  2,638,328
METHOD OF HEATING FLUIDS
Filed June 1, 1949
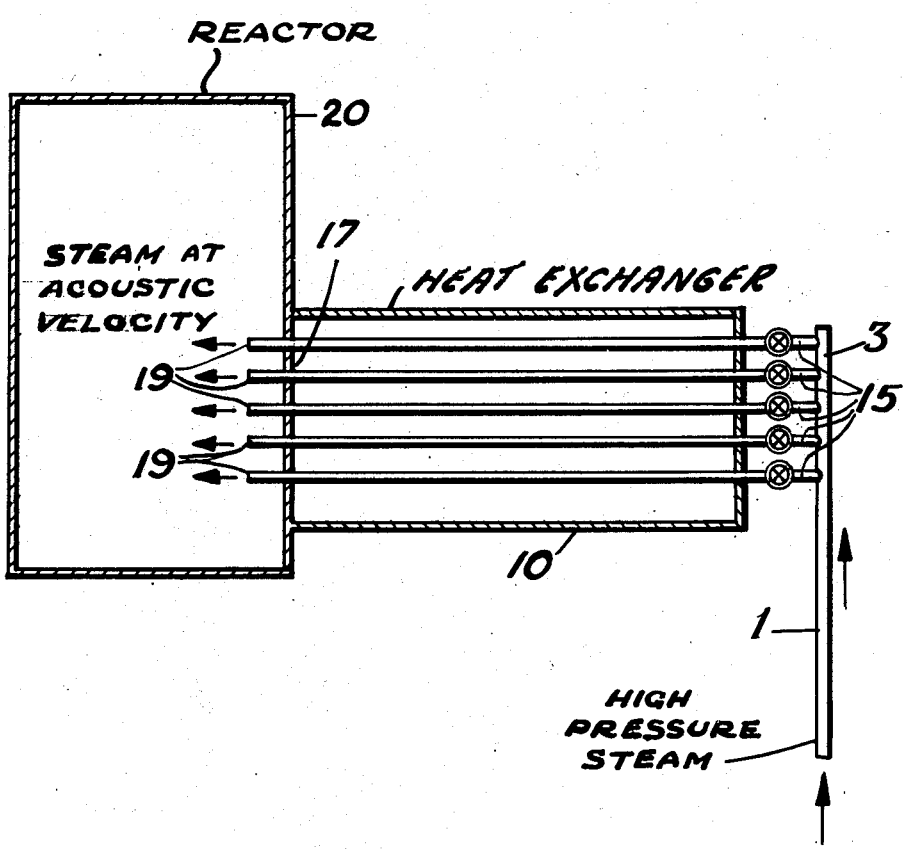
Warren K. Lewis, Jr. Inventor
By J. Cashman Attorney Patented May 12, 1953

2,638,328

UNITED STATES PATENT OFFICE 2,638,328

METHOD OF HEATING FLUIDS

Warren K. Lewis, Jr., East Orange, N. J., assignor to Standard Oil Development Company, a corporation of Delaware Application June 1, 1949, Serial No. 96,569

3 Claims. (Cl. 257—1)

The present invention relates to improvements in raising the temperature of fluids, such as vapors or gases. More particularly, the invention is concerned with a novel method for heating vapors and gases in indirectly heated flow paths to a temperature above that otherwise attainable, by converting kinetic energy of the flowing gases or vapors into heat.

Many chemical and other processes require the heating of gaseous agents or reactants to temperatures substantially above 1000° F. When all heat is supplied to the gases and vapors by external heating, special construction materials, such as expensive steel alloys, are required above certain temperatures for heating coils which will withstand the combined attack of high temperature heat and pressure, particularly in view of the fact that the temperature of the heating medium is normally substantially above that desired for the gases and vapors to be heated. For example, in superheating steam, alloy steel tubes are required when steam temperatures substantially above 1000° F. are desired and particularly when the steam is supplied to the superheater at relatively high pressures. Examples for high temperature requirements are steam superheating, preheating of hydrocarbon gases or vapors for various endothermic reactions such as reforming with steam and/or $CO_2$, cracking, etc., preheating of natural gas and oxygen or air for production of synthesis gas, etc. Some of these treatments involve heating through certain relatively narrow but critical temperature ranges. For example, when hydrocarbon gases are heated to high temperatures excessive coke deposition is sometimes encountered within a narrow critical temperature range where retrograde condensation occurs.

The present invention permits a substantial rise in the temperature of indirectly heated flowing gases and vapors to a desired level in a manner which alleviates or eliminates the disadvantages mentioned above.

It is, therefore, the principal object of the invention to provide an improved method for heating flowing gases and vapors.

A more specific object of the invention is to provide an improved method of the type specified which permits a temperature increase of indirectly heated flowing gases and vapors without raising the temperature to the desired level within the indirectly heated flow paths.

Other and more specific objects and advantages will appear from the subsequent detailed description wherein reference will be made to the accompanying drawing, the single figure of which illustrates schematically a system adapted to carry out an embodiment of the invention.

In accordance with the present invention, gasiform fluids to be heated are passed through an elongated indirectly heated confined path at a rapidly increasing flow velocity until the flow velocity of the fluids being heated has reached the maximum attainable under the prevailing conditions whereupon the flow velocity is suddenly reduced to a value approaching zero as closely as possible. Immediately prior to the sudden reduction in flow velocity, the high velocity fluid has attained a considerable kinetic energy. This energy is converted into heat at the instant of velocity reduction whereby the temperature of the fluid is raised substantially above that reached immediately prior to the velocity reduction. This rise in temperature takes place without the requirement of a corresponding extraneous heat supply during the velocity reduction and the actual period of temperature rise. The point of velocity reduction preferably coincides as closely as possible with the point of intended use of the heated fluid.

The increase of the flow velocity along the heated confined path, for example in a tube, may be readily obtained by means of a substantial pressure drop along this path in the direction of fluid flow and without any substantial change in cross-section of said path. The sudden reduction in flow velocity is most effectively accomplished by a sudden substantial increase in the diameter or cross-section of the flow path, for example by passing the high velocity fluid from a narrow heating tube directly into a large treating vessel. Under normal conditions, i. e. in the case of substantially straight heating tubes and when no gas impellers such as compressors, etc. are employed, the maximum flow velocity attainable by means of pressure drop will closely approach and frequently reach the velocity of sound in the fluid used at the prevailing conditions of temperature and pressure, provided the back pressure on the heating tubes is low enough. If higher maximum velocities are desired, flow paths such as heating tubes flaring outwardly in the direction of fluid flow may be used in combination with a greater pressure drop over the flow path.

As a result of this method of heating, the gas or vapor temperature at the hot end of the high velocity heating path is considerably lower than that attained after velocity reduction, i. e. at the point of use which is the temperature ultimately desired, so that in many cases investment and operating cost of the heating means may be substantially reduced by eliminating the use and upkeep of high alloy steel heating tubes. The invention affords the further advantage that the high velocity produces a very high heat transfer coefficient on the fluid side, so that the wall temperature will be practically as low as that of the adjacent fluid to be heated. In addition, the temperature of the fluid being heated indirectly may be substantially lower within the indirectly heated path than the temperature of this fluid would be within said path if the entire increase in temperature is to be accomplished by indirect heating alone. This lower temperature results in an increased temperature differential across the tube walls and hence permits a decrease in heating surface. Also in many cases critical temperature ranges of the type mentioned above may be passed through within a very small fraction of the time previously required, thus eliminating the detrimental effects of such critical temperature ranges.

For example, steam at 1200° F. and 400 p. s. i. g. pressure has an acoustic velocity of 2400 ft. per sec., i. e. the velocity of sound travelling through steam at these conditions is about 2400 ft. per sec. When the steam flows at this velocity it has a kinetic energy of about 115 B. t. u. per lb. of steam, which may be converted into thermal energy and a corresponding temperature rise in accordance with the invention. The total energy of steam flowing at its acoustic velocity under the conditions specified thus is equal to that of low velocity steam at about 1412° F. Thus, if steam is needed at a temperature of about 1400° F. it is sufficient in accordance with the present invention so to heat the steam by indirect heating that, at approximately its acoustic velocity, it has a temperature of merely about 1200° F. and to generate the additional heat required to increase the temperature to about 1400° F. by a sudden velocity reduction to a velocity of about zero ft. per second.

It may be noted that sonic or acoustic velocity as defined above may be easily obtained by means of establishing a suitable pressure differential over any desired flow path. Thus, in the case of steam, for example, if steam is available at 145 p. s. i. abs., dry and saturated, sonic velocity may be reached in a pipe of 2 in. inner diameter and 60 ft. length if the back pressure is about 50 p. s. i. abs. or less. This represents an absolute pressure reduction of over 50%, that is, $P_1/P_2$ is greater than 2 or $P_2/P_1$ is less than 0.5, specifically about 0.345, where $P_1$ represents absolute initial pressure and $P_2$ represents pressure at the exit end of the tube. Similar relationships exist for other gases and other initial conditions. Quite generally it may be stated that in a pipe of negligible length the sonic velocity is usually attained whenever the absolute back pressure is equal to or less than about 0.5–0.6 times the absolute initial pressure. As the pipe length increases the maximum permissible back pressure for sonic velocity continually decreases. The actual length of the heating tubes is determined by considerations of flow velocity and heat transfer surface requirements, the latter being conducive to the choice of greater tube length in order to increase the heat transfer in the high velocity zone.

It will be apparent that as the fluid passes through the pipe or conduit with rapidly increasing velocity and dropping pressure it expands rapidly in volume, even though the cross-sectional area of the conduit is substantially constant. Thermal energy is consumed, of course, in this expansion but it is replaced, or at least substantially replaced, by the heat applied to the conduit.

It will also be understood that as a result of the increase of velocity of the fluid flowing along the indirectly heated path, some thermal energy or heat imparted to the fluid by the heating agent will be converted into kinetic energy with a concomitant drop in temperature in the path regions of highest flow velocity. However, the thermal energy so converted will be completely recovered as heat in the form of a corresponding temperature rise upon the sudden velocity reduction in accordance with the invention. This condition is conducive to relatively low wall temperatures of the flow path, which further reduces the heat resistance requirements of the construction material used.

In illustration of these conditions, reference may be made to the heating of methane in accordance with the invention. The table below shows the conditions obtained at various points in a 1 inch tube if the initial conditions in the tube are those shown in the second horizontal row of figures and if the heat input is 50,000 and 25,000 B. t. u./hr./sq. ft., respectively, throughout the length of the tube.

| Distance From Start, Feet | Velocity, Feet Per Second | Pressure, p. s. i. g. | Temp., ° F. for 50,000 B. t. u./hr./sq. ft. heat input | | Temp., ° F. for 25,000 B. t. u./hr./sq. ft. heat input | |
|---|---|---|---|---|---|---|
| | | | Actual | Equivalent | Actual | Equivalent |
| 0 (outside tube) | 0 | 100.3 | 1,011 | 1,011 | 1,064 | 1,064 |
| 0 (inside tube) | 900 | 86.0 | 993 | 1,011 | 1,046 | 1,064 |
| 7.84 | 1,200 | 63.4 | 1,042 | 1,074 | 1,063 | 1,095 |
| 11.22 | 1,500 | 48.1 | 1,051 | 1,101 | 1,059 | 1,109 |
| 12.67 | 1,800 | 37.3 | 1,040 | 1,112 | 1,042 | 1,114 |
| 13.09 | 2,000 | 31.7 | 1,026 | 1,116 | 1,026 | 1,116 |
| 13.25 | 2,200 | 27.0 | 1,009 | 1,117 | 1,009 | 1,117 |
| 13.27 (inside tube) | 2,294 | 25.0 | 1,000 | 1,117 | 1,000 | 1,117 |
| 13.27 (outside tube) | 0 | 25.0 | 1,117 | 1,117 | 1,117 | 1,117 |

The columns of the table designated "Equivalent Temperature," give the temperatures which the gas would have if all its kinetic energy were converted quantitatively to heat. The top row gives the conditions which exist just before entering the tube. The second row gives the conditions just after entering the tube; it will be noted that some of the heat energy or enthalpy has been converted into the kinetic energy equivalent to 900 ft./sec. As the gas proceeds along the tube the velocity becomes greater and greater until finally at the end (the second row from the bottom) the sonic velocity of 2294 ft./sec. has been attained. The temperature rises for the greater part of the tube, due to the continuous addition of external heat, but at the end of the tube the conversion of thermal into kinetic energy becomes so rapid that the temperature decreases again. The bottom row gives the conditions immediately after leaving the tube, when all the kinetic energy has been reconverted to thermal energy.

When the heat input is 50,000 B. t. u./hr./sq. ft., the final temperature, after the methane has left the tube and the velocity has been reduced to zero, is 1117° F., yet the maximum temperature at any point within the tube is only 1051° F. Normally the temperature within the exchanger tubes should be held below a certain maximum because of the danger of cracking. It is evident, that the invention facilitates this considerably by attaining a final temperature 66° higher than that required within the exchanger tubes. If the methane is to be used, along with oxygen, e. g. for generating mixtures of CO and $H_2$ such as synthesis gas, then this 66° additional temperature will additionally result in a saving of about 1% in oxygen and about 0.3% in natural gas for the same production of $H_2+CO$.

For a nominal 10,000 bbl./day hydrocarbon synthesis plant, this may amount to an investment saving of about $200,000, as well as in substantial savings of natural gas. The required pressure drop through the exchanger tubes will not normally entail extra cost as the natural gas is usually available at a considerable pressure.

While the invention is not limited to any specific technical means for its practical application, a system which on account of its simplicity is particularly suited for this purpose is schematically illustrated in the drawing. It will be briefly described using the superheating of steam as an example. However, other gasiform fluids may be heated in a generally analogous manner.

Referring now to the drawing, the numeral 10 designates a heat transferring chamber or heat exchanger provided with a bundle of externally heated heating tubes 15. Chamber 10 may be fired in any conventional manner (not shown) to transfer heat to the fluids passing through said tubes 15. The vessel identified by the numeral 20 may be any kind of a reactor in which high temperature steam is to be reacted with other materials, for example a water gas generator for the conversion of coal or coke with steam and oxygen into gas mixtures containing CO and $H_2$. As shown in the drawing, the hot-end tube sheet 17 of chamber 10 forms part of the wall of reactor 20 where the steam is to be used.

In operation, high pressure steam may be supplied through line 1 and header 3 to tubes 15, for example, at a temperature of, say, about 1310° F. and a pressure of, say, about 150 lbs. per sq. in. abs. The pressure in reactor 20 may be about 50 lbs. per sq. in. abs. Here the ratio of $P_2/P_1$ is 0.333. Tubes 15 may have an inner diameter of about 1 in. and a length of about 20 ft. from header 3 to the opposite tube ends 19 opening directly into reactor 20. Chamber 10 may be fired at such a rate that about 25,000 B. t. u. per hour per sq. ft. tube surface are supplied to tubes 15.

At the conditions specified, the steam will reach ends 19 at a temperature of about 1200° F. and at about its sonic velocity of about 2400 ft./sec. When the steam enters reactor 20 its velocity drops instantly to approximately zero and the temperature of the steam jumps simultaneously to about 1416° F. at which the steam becomes available for reaction. By this method a temperature gain of over 200° F. is attained.

The system illustrated in the drawing affords the special advantage that no header is required at the hot-ends 19 of the tubes. In this manner, all erosion and overheating of such headers by the high velocity steam is avoided.

Various other systems suitable for carrying out the invention will suggest themselves to those skilled in the art upon reading the foregoing description without deviating from the spirit of the invention.

While the production of synthesis gas and the heating and/or conversion of hydrocarbon gases, such as methane or natural gas, have been referred to above as fields of application for the present invention, other applications such as hydroforming wherein it is important to minimize pyrolytic reactions during the heating step, production of butadiene by high temperature cracking of butylene; etc. are within the scope of the invention as will be understood by those skilled in the art.

The foregoing description and exemplary operations have serve to illustrate specific embodiments of the invention but are not intended to be limiting in scope.

What is claimed is:

1. The process of heating a gasiform fluid flowing through a path of relatively small cross-section defined by confining walls to a temperature in excess of that which can be obtained practically in said path, which comprises introducing said fluid at a temperature below the maximum safe temperature for said walls into said path at an absolute pressure at least double the pressure at the exit end of said path, applying heat to said fluid as it passes throughout said path, the length and cross-section of said path and the pressure and heat conditions being so controlled that said fluid attains high kinetic energy and at least a major part of its sonic velocity in said path without excessive drop in temperature, and passing said fluid directly from said path into a zone of very greatly increased cross-section, as compared with that of said path so as to reduce its velocity substantially to zero and convert a substantial part of said kinetic energy into heat, said application of heat being at such a rate that said safe wall temperature will not be exceeded.

2. Process according to claim 1 applied to steam wherein a temperature gain of at least 100° F. is obtained by said conversion.

3. Process according to claim 1 wherein the path is arranged substantially linearly and has a substantially uniform cross-section.

WARREN K. LEWIS, JR.

References Cited in the file of this patent

UNITED STATES PATENTS

| Number | Name | Date |
|---|---|---|
| 1,168,298 | Gibson | Jan. 18, 1916 |
| 1,723,340 | Faber | Aug. 6, 1929 |
| 1,740,254 | Loffler | Dec. 17, 1929 |
| 1,781,836 | Flatt | Nov. 18, 1930 |
| 2,297,726 | Stephanoff | Oct. 6, 1942 |

FOREIGN PATENTS

| Number | Country | Date |
|---|---|---|
| 400,163 | Great Britain | Jan. 14, 1932 |

OTHER REFERENCES

Pages 249 and 250 of Heat & Thermodynamics, Zemansky, second edition, published by McGraw-Hill Co., Inc., New York city.